(12) United States Patent
Rooke et al.

(10) Patent No.: US 11,865,552 B2
(45) Date of Patent: Jan. 9, 2024

(54) CENTRIFUGE APPARATUS WITH FLYING LEADS

(71) Applicant: Dynamic Extractions Limited, Blaenau Gwent (GB)

(72) Inventors: David Rooke, Blaenau Gwent (GB); Colin Bright, Blaenau Gwent (GB)

(73) Assignee: Dynamic Extractions Limited, Blaenau Gwent (GB)

( * ) Notice: Subject to any disclaimer, the term of this patent is extended or adjusted under 35 U.S.C. 154(b) by 623 days.

(21) Appl. No.: 16/761,883

(22) PCT Filed: Nov. 14, 2018

(86) PCT No.: PCT/GB2018/053302
§ 371 (c)(1),
(2) Date: May 6, 2020

(87) PCT Pub. No.: WO2019/097230
PCT Pub. Date: May 23, 2019

(65) Prior Publication Data
US 2021/0178404 A1    Jun. 17, 2021

(30) Foreign Application Priority Data

Nov. 16, 2017    (GB) .................................... 1718939

(51) Int. Cl.
| | |
|---|---|
| *B04B 5/02* | (2006.01) |
| *B04B 5/04* | (2006.01) |
| *B04B 13/00* | (2006.01) |
| *B04B 5/10* | (2006.01) |
| *B04B 9/10* | (2006.01) |
| *G01N 30/42* | (2006.01) |

(52) U.S. Cl.
CPC .............. *B04B 5/02* (2013.01); *B04B 5/0442* (2013.01); *B04B 13/00* (2013.01); *B04B 5/10* (2013.01); *B04B 9/10* (2013.01); *G01N 30/42* (2013.01)

(58) Field of Classification Search
CPC ....... A44C 17/02; A44C 17/04; A44C 27/001; A44C 27/006; A44C 17/001; G04B 5/16; G04B 19/12; G04B 47/042; G04B 19/10; Y10T 29/24
See application file for complete search history.

(56) References Cited

U.S. PATENT DOCUMENTS

| | | | |
|---|---|---|---|
| 3,753,351 A * | 8/1973 | Pause ........................ | B04B 9/06 60/486 |
| 4,430,216 A | 2/1984 | Yoichiro | |
| 2014/0249013 A1* | 9/2014 | Wood ........................ | B04B 5/02 494/15 |

FOREIGN PATENT DOCUMENTS

| | | | |
|---|---|---|---|
| CN | 104874201 A * | 9/2015 | |
| CN | 104874201 A | 9/2015 | |
| EP | 1492623 B1 | 7/2010 | |

(Continued)

*Primary Examiner* — Walter D. Griffin
*Assistant Examiner* — Shuyi S. Liu
(74) *Attorney, Agent, or Firm* — GableGotwals

(57) ABSTRACT

A centrifuge apparatus includes a plurality of modules, each including a rotatable body, housing and flying leads, assembly. The modules can be selectively interconnected to allow adaptation of the processing capacity of the apparatus to process a liquid to remove components therefrom and/or to process a number of different liquids and allow the separation of one or more types of components therefrom simultaneously.

13 Claims, 5 Drawing Sheets

(56) References Cited

FOREIGN PATENT DOCUMENTS

| | | | |
|---|---|---|---|
| WO | 9420849 A1 | 9/1994 | |
| WO | 2015186057 A1 | 12/2015 | |
| WO | WO-2015186057 A1 * | 12/2015 | .......... A61M 1/3696 |

* cited by examiner

CENTRIFUGE APPARATUS WITH FLYING LEADS

CROSS-REFERENCE TO RELATED APPLICATIONS

This United States application is the National Phase of PCT Application No. PCT/GB2018/053302 filed 14 Nov. 2018, which claims priority to British Patent Application No. 1718939.0 filed 16 Nov. 2017, each of which is incorporated herein by reference.

The invention to which this application relates is to an improvement in centrifuge apparatus and, in particular, the form of apparatus which includes a number of leads or tubes, commonly referred to as "flying leads" which are mounted with respect to a body to be rotated at relatively high speeds in order to allow the separation of components of liquid which is supplied to and passes through the flying leads as the same are rotated.

The separated components are then collected and utilised as required. One known use is for counter current chromatography (CCC) which is a technique in which substances are caused to partition between two liquid phases in a column in the form of a helix or spiral and one phase is a static phase and the other is a mobile phase. The static phase is kept static using centripetal acceleration by rotating the column about a first axis while the column is itself rotated orbitally about a second axis radially distanced from the centre of the column, i.e. in a "planetary" rotation. Whilst in this planetary motion the mobile phase is caused to flow along the column in contact with the static phase. This two-component rotational motion causes rapidly fluctuating centrifugal forces in the column, resulting in alternating mixing and de-mixing of the static and mobile phases, and consequent separation of the substance between the static and mobile phases so that substances in the mobile phase become located at distinct positions in the flow of the mobile phase.

A number of different forms of constructions are possible. One construction includes a helical coil of tubing mounted on a bobbin. In another construction a spiral column is formed between two mating substrates. Most columns are wound as multiple helical layers and an example of such apparatus is described in the applicant's patent EP1492623. Typically such centrifuge apparatus comprises either one such column mounted for rotation and balanced by a counterweight, or two columns mounted diametrically opposite so that they balance each other.

It is necessary to provide liquid flow communication between the rotating columns and stationary liquid input and output means. This communication is normally provided by tubular input and outlet conduits referred to in the art as "flying leads". Typically each flying lead is threaded along the second axis, about which the columns rotate in planetary orbital rotation, and then connects with the column, typically along the first axis about which the column itself rotates. By arranging the flying leads in this way, the respective winding effects of rotation of the flying leads about the first and second rotation axes cancel each other out and the flying leads do not become tangled. However, a problem still exists with regard to the lifetime of components, such as the flying leads, between maintenance or replacement intervals. Furthermore, the flying leads which are typically fitted have a 1.6 mm outside diameter and an internal diameter (bore) of 0.8 mm which restricts the maximum flow rate of the mobile phase that can be pumped through the column. This, in turn, restricts the throughput and operating capacity of the apparatus. The scaling up of the apparatus creates problems and, for example, the provision of a flying lead with larger sizes increases the stiffness of the leads which can shorten the service life of the flying leads and efforts to mitigate this by applying grease to the leads at regular intervals can itself lead to other problems in operation of the apparatus.

Thus there are a number of factors which restrict the use of large scale counter current chromatography, one being the lifetime of the components of the centrifuge apparatus under the stresses of rotation and another being the problems which are created by attempts to scale up the size and capacity of the apparatus.

The difficulties in manufacturing larger scale apparatus whilst achieving effective operation and the reliability of operation of this form of apparatus means that at present there tends to be two distinct formats of the apparatus, a first form which is provided for use on a laboratory scale to allow relatively small scale operation and throughput and the second form of the apparatus which is created for large scale commercial usage. It is found that the two types of apparatus are so distinct and it is found that the large scale apparatus can often be used at a relatively reduced capacity which is inefficient and expensive and conversely, on occasion, the laboratory scale apparatus does not have a sufficient capacity to allow the required throughput at a given time to be achieved. Despite this, the difference in cost between the two types of apparatus is such that the larger scale format of apparatus is not a realistic option for relatively small organisations.

The apparatus is typically used in the targeting, separation and removal of one or more specified components of a material such as a biomass material which can include, for example, plant biomass such as *cannabis*, brassicas, microalgae and fermented compounds and/or liquids such as polluted water. The components which are extracted can be selected from a wide range and examples of components are peptides, polypeptides, DNA, insecticides, pollutants from water. As such the apparatus allows the extraction of the components in one or a short number of steps and thereby allow the extracted components to then be available for subsequent processing and use as required.

An aim of the present invention is to provide centrifuge apparatus in a form which allows the same to be scalable in a selective and efficient manner and thereby allow the user of the apparatus the option of selectively increasing the capacity of the apparatus in a modular manner. A further aim is to be able to continue to utilise existing apparatus and, as and when required, increase the capacity and throughput of the same by the selective adaptation.

In a first aspect of the invention, there is provided centrifuge apparatus including an inlet for the supply of one or more or liquids to pass through the apparatus, at least one pump to allow the liquid to be pumped into and through a plurality of flying lead assemblies, at least one body in which at least one flying lead assembly is located and from which separated components of the said liquid are collected via one or more outlets, said body rotatable with respect to a housing so as to allow the separation of the said components and wherein the said body, housing and flying leads assembly are provided as a module so as to allow the adaptation of the processing capacity of the apparatus by the selective interconnection of a number of said modules.

Typically, the module includes connection means to allow the same to be connected to supply means and collection means.

In one embodiment, the supply means and/or collection means are the same for each of the modules which is used to form the apparatus at that time.

In one embodiment said liquid supply is provided in the form of a reservoir of the one or more liquids and which is used to supply each of the modules.

In one embodiment, the pump is provided to allow the supply of the liquid to each of the modules which is connected at that time.

Typically the apparatus includes at least one motor provided to allow the rotation of each body of the modules which are connected together to form the apparatus and each body rotates with respect to the housing with which the same is located.

In one embodiment the drive connection means are provided so as to allow each of the bodies of the modules which are connected to form the apparatus, to be rotated by a common motor.

In one embodiment each said module includes a motor to rotate the body. Typically, synchronisation means are provided so as to allow, when a plurality of modules are connected together to form the apparatus, the said module motors to be operated in a synchronised manner, or independently.

In one embodiment, the apparatus includes a support structure in which the supply means and collection means can be located or connected to, and engagement means are provided to allow the selective engagement of one or more of said modules therewith.

Typically the support structure acts as a centralised location for each of the modules which are selected to be used to form the apparatus with the required capacity.

Typically the apparatus includes a control system which can be used to selectively control each of the modules such as, in one embodiment, to allow the selective and independent operation of each of the modules and at other times the combined operation of each of the modules for the same purpose so as to form, in practice, apparatus of a significantly greater throughput capacity.

Thus, in accordance with the invention there is provided the ability to utilise modules of centrifuge apparatus which allows relatively small scale centrifuge apparatus to be used in combination to form apparatus with a greater capacity whilst maintaining the use of apparatus which is in a laboratory scale format.

In one embodiment the support structure includes an air circulations system to allow control of the operating environments within the structure.

In one embodiment the centrifuge body is cast and there is provided a gap between the centrifuge body and the housing so as to allow the replacement of the flying leads.

In one embodiment the modular units can be operated separately or collectively or in any combination. This enables the opportunity to perform several different processes at the same time or link them together in any order to perform sequential separation processes.

In a further aspect of the invention there is provided a method of operation of centrifuge apparatus comprising a selected number of modular units as herein described wherein said method includes selectively connecting one or a number of modules to one or more liquid supply means and simultaneously operating the modules to extract components from the one or liquids supplied thereto.

In one embodiment a complex mixture of components is obtained from a source and separate target compounds are separated therefrom by reusing the mobile and stationary phases of the modular units.

In one embodiment the processes are completely contained and recycled within the apparatus which is formed by the combination of modular units.

In one embodiment the source is any, or any combination, of a plant or biomass extract, a waste stream from natural or synthetic processes.

Specific embodiments of the invention are now described; wherein

Figure 1:
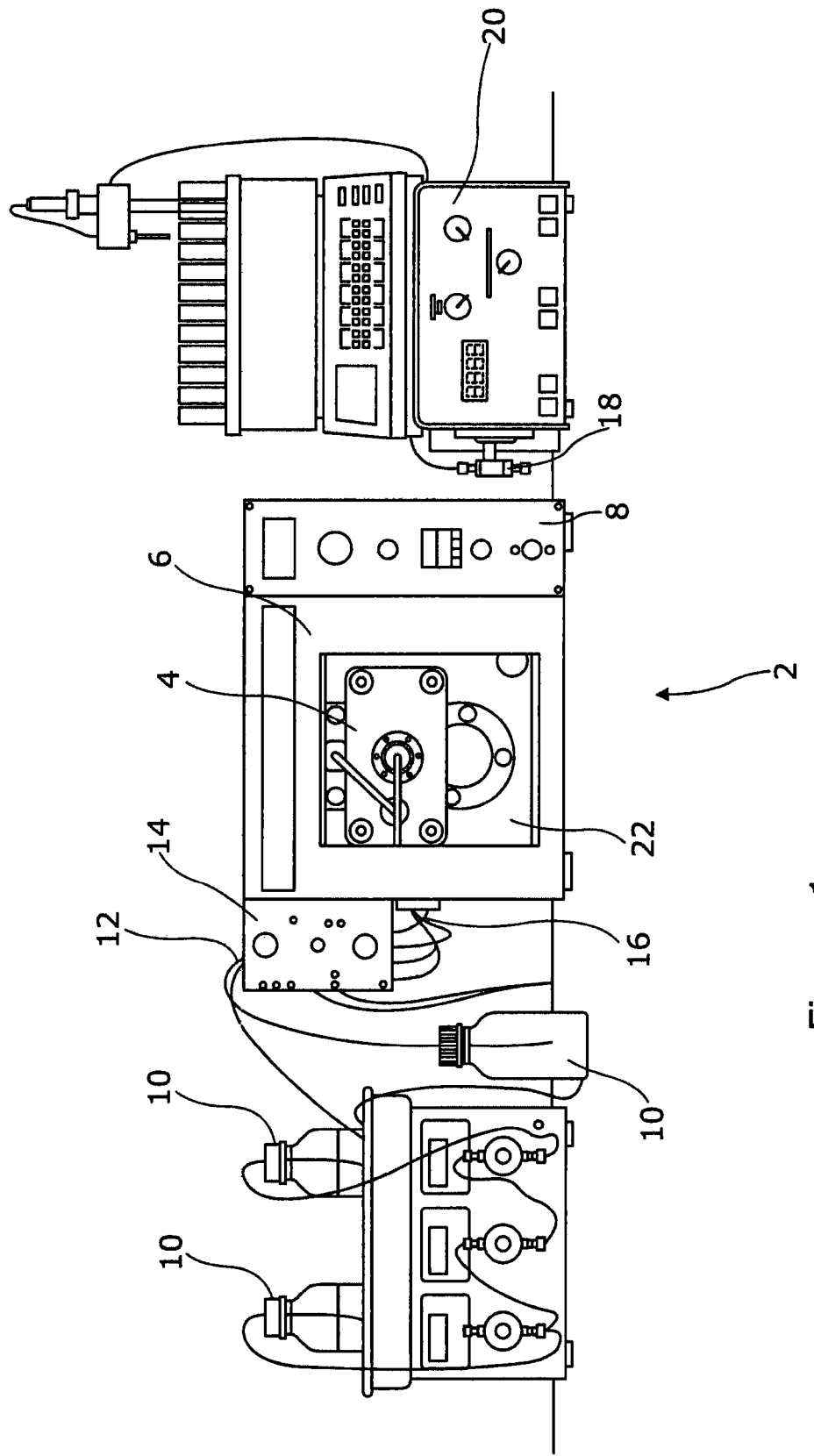
FIG. 1 illustrates apparatus in a conventional format.
Figure 2:
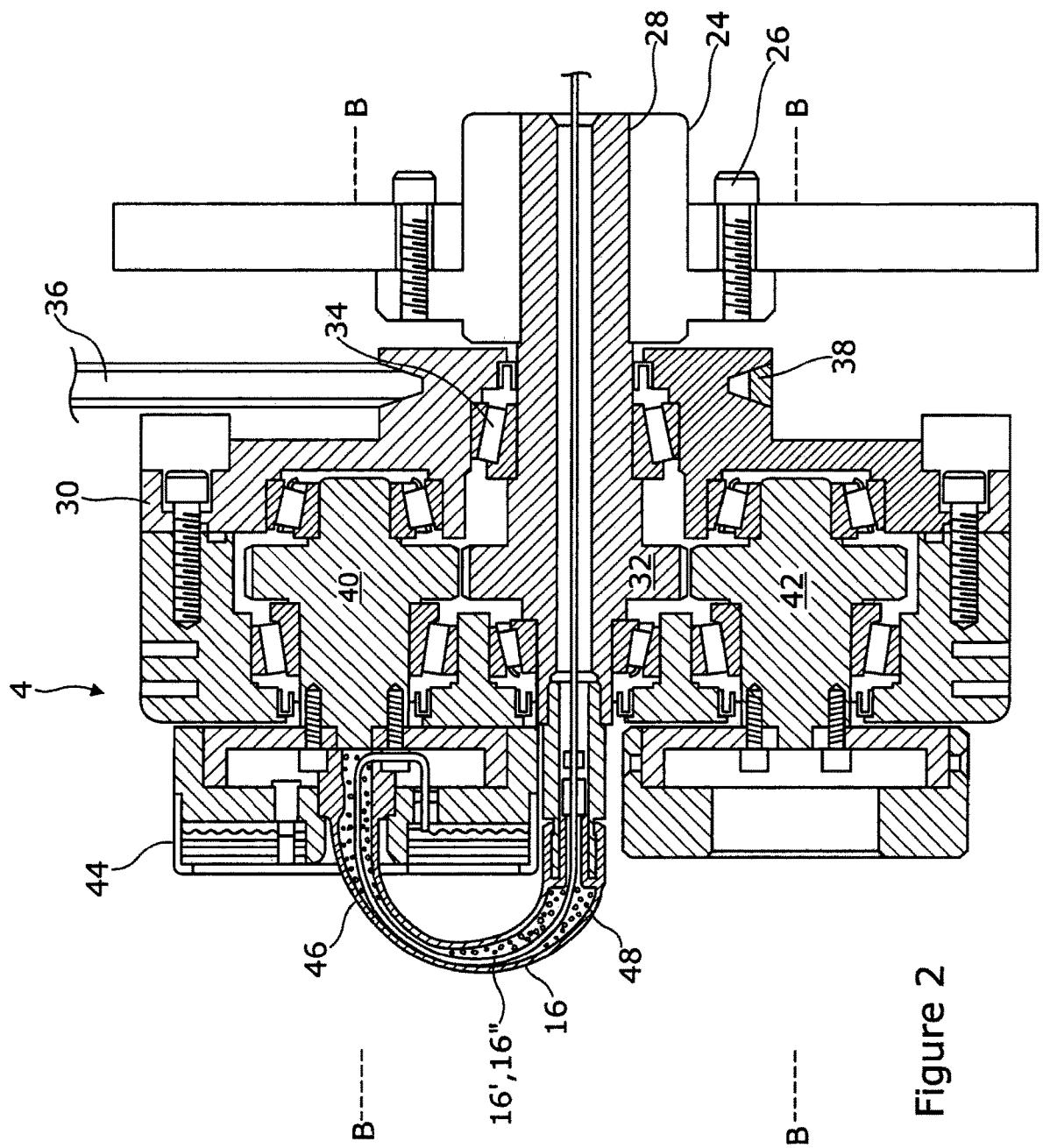
FIG. 2 illustrates a cross sectional elevation of conventional centrifuge apparatus.

Referring firstly to FIGS. 1 and 2 there is illustrated centrifuge apparatus 2 in a conventional format. The apparatus 2 includes a centrifuge body 4 intended to be rotated at high speeds, for example in excess of 2000 rpm. The centrifuge body 4 is located in a housing 6 for protection and control of environmental conditions such as temperature. A control system 8 is provided in the housing along with a motor (not shown) to allow rotation of the body 4. Liquid reservoirs 10 are connected to an inlet 12 to allow the required liquid to enter into the centrifuge body via pump unit 14 and flying leads 16 and an outlet 18 allow the separated liquid components to leave the centrifuge body 4 and be collected at collection apparatus 20 and stored for subsequent use.

The centrifuge body 4 is mounted on a support wall 22 of the housing via a mounting bush 24 by fastening means 26. The mounting bush holds a shaft 28 on which a drive rotor 30 is mounted via roller bearings 32, 34. A drive belt 36 is provided which drives a corresponding pulley 38 of the drive rotor. Rotatably mounted to the drive rotor are two planetary shafts 40, 42 disposed diametrically opposite each other and mounted for rotation about second axes B-B diametrically opposite each other. A bobbin 44 is open at its centre allowing for the placement of the flying leads 16 passing through the middle of the column. A first end 46 of the flying lead section 16 is coupled to the shaft. The flying leads include inlet leads 16', and outlet leads 16" in the form of tubular conduits.

Figure 3:
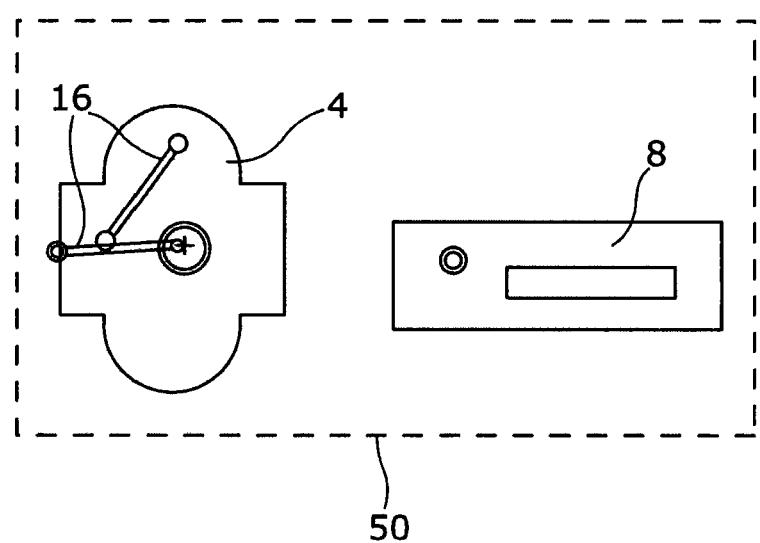
FIG. 3 illustrates the components forming a module in accordance with the invention.

In FIG. 3 there are shown components of the apparatus 2 which, in this embodiment, are provided as a module 50 in accordance with the invention and these components include the centrifuge body 4, control means 8, and flying leads 16. Inlet and outlet connections for the supply of liquid to and from the centrifuge body 4 are also provided. In another embodiment components in the form of a pump 14 and/or motor can be provided as part of the module.

Figure 4A:
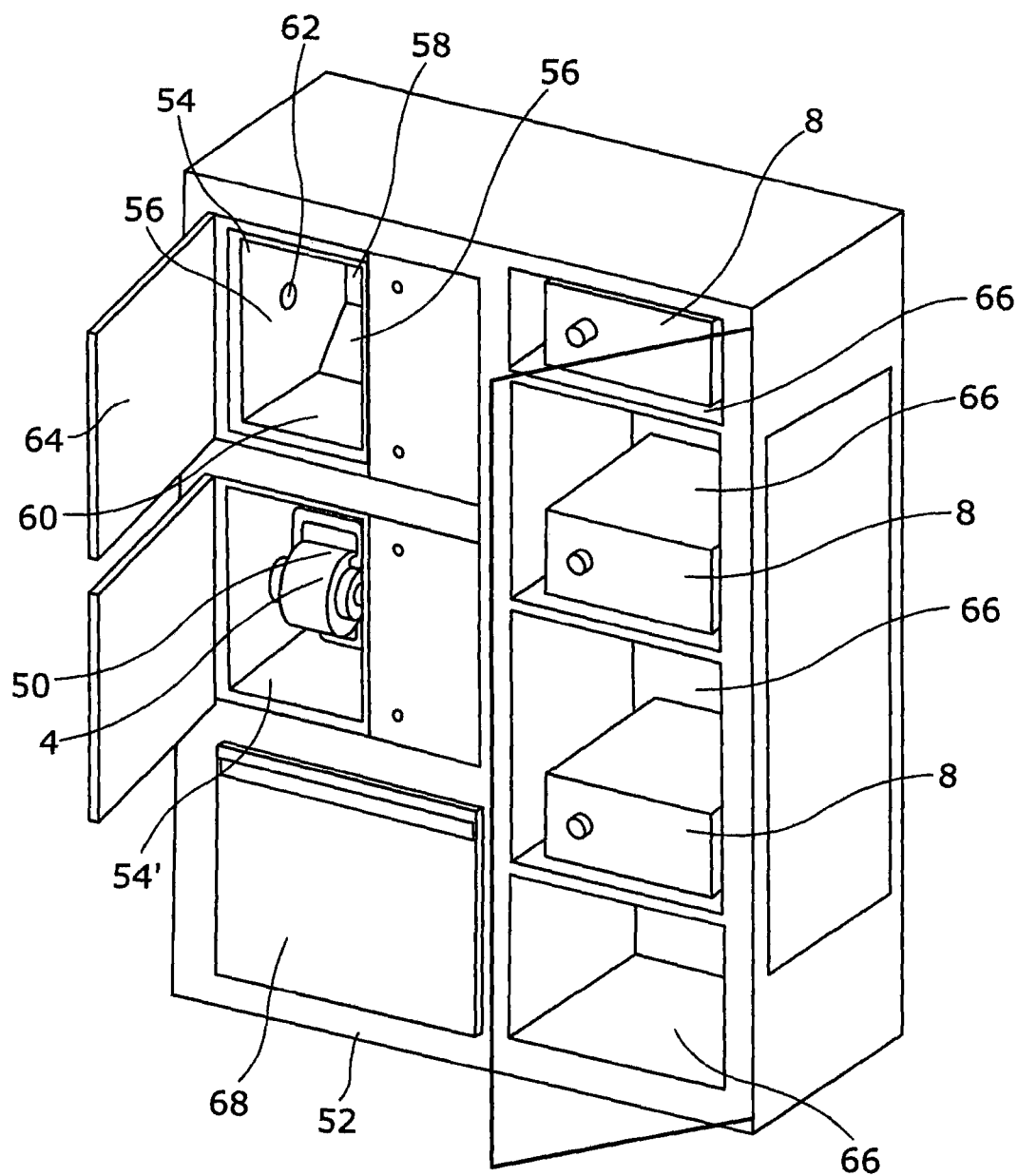
FIGS. 4a and b illustrate embodiments of apparatus in accordance with the invention.

FIGS. 4a and b illustrate one configuration of the apparatus in accordance with the invention and illustrates the manner in which a number of modules 50 of FIG. 3 can be selectively used to allow the processing capacity and/or types of processing of the apparatus to be selected and adapted for different uses.

The apparatus includes a support structure 52 as shown in FIG. 4a, and the support structure defines a number of compartments. A first set of compartments 54 are provided each available to receive a module 50 including the centrifuge body 4 and flying leads 16 engaged therewith and typically at least control means connections and one module 50 is shown in location in compartment 54'. The module may be provided with a housing with walls in which the body and flying leads are located and the housing fits into the compartment. Alternatively the walls 56 of the compartments can be used as part of the module 50 and with respect to which the body is located. In either case the walls 56 of the compartments are used to support the module and the centrifuge body 4 rotates about its axis in respect thereto and these walls in conjunction with the rear wall 58, floor 60, top wall 62 and door 64 also form a protective means for the module. The compartments 66 are provided to allow for the reception of the control means 8 for the operation of the centrifuge apparatus and it will be appreciated that the control means can be operated so as to allow each of the centrifuge bodies 4 which are located in the support structure at that time to be operated independently or to be operated jointly so as to effectively form a larger capacity centrifuge apparatus and so that the support structure may have a number of rotating bodies of respective modules rotating therein simultaneously.

The compartment 68 is provided, in this embodiment to receive therein at least one pump apparatus 14 and at least one motor apparatus. In this embodiment the pump apparatus can be connected to each of the modules 50 when present in the support structure so as to act as a common supply means for liquid to the centrifuge bodies 4 from a common liquid reservoir 10 and/or to allow the separated liquid components to be passed to common collection apparatus 20. Also, suitable drive connections are provided between the motor in the compartment 68 and the compartments 54, so as to allow the same motor to be used to selectively drive and rotate the centrifuge bodies 4 of the modules that are present in the support structure 52 at that time. In an alternative embodiment each of the modules includes or is connected to its own motor to drive the rotation of the body for that module. In one embodiment the control means allows for the motors to be controlled to operate in a synchronised manner or independently, depending on the required operation of the apparatus at that time.

In certain conditions of operation the provision of the operation of the motors, and hence modules independently, allows easier adaptation of the apparatus where there are no flame proof zones or high containment considerations and thereby allowing faster stopping and swapping of individual modules. For example, in the case of a zone 1 or zone 0 safety hazard and high containment requirement the operation of the modules are best served by an externally located common motor drive to which the module bodies are connected so as to be driven to rotate. However, if the apparatus is used with environmentally sustainable and "green" solvents; then the containment requirements are reduced and so there is a greater flexibility provided by allowing each module to have its own drive motor so that the module can be removed for service/maintenance and replaced thereby simplifying the design and adaptation by using independent drive motors and plc controllers.

Figure 4B:
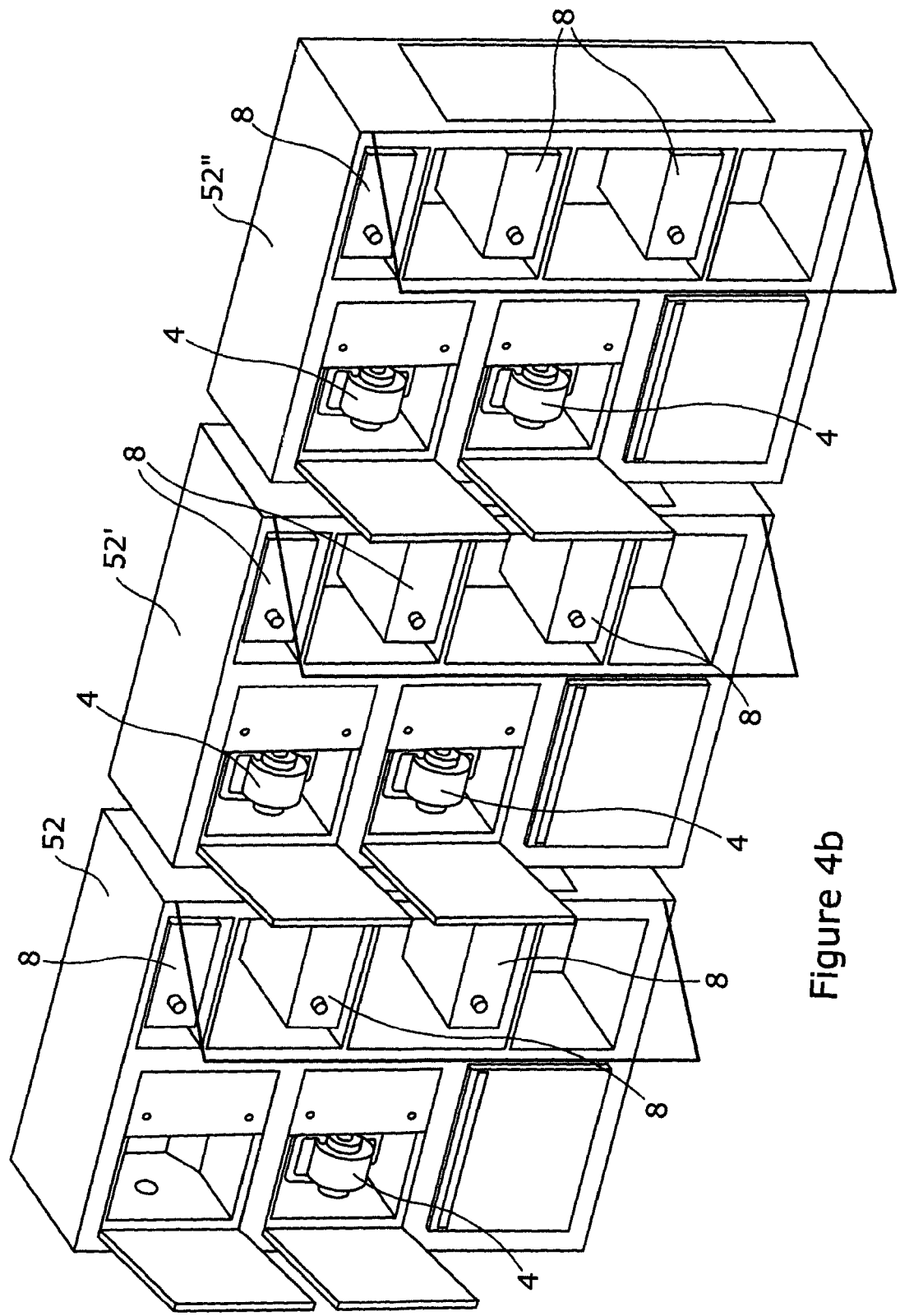

In FIG. 4*a* therefore the apparatus has the capability to include two modules 50 and a module 50 is shown in location in compartment 54'. FIG. 4*b* illustrates the manner in which a number of support structures 52, 52', 52" can be used in combination such that the combined support structure has a maximum capacity of six modules and, in the example shown, five modules 50 are provided and operable independently or in combination to provide apparatus of the required increased capacity.

In one embodiment six modules could be used to process up to 10 kilograms of material per day and the outputs of the modules can be combined or streamed independently. This output can therefore be achieved using apparatus which has a significantly smaller physical footprint than conventional apparatus used to provide this output, or a greater output than can be achieved from a single form of this type of apparatus and the apparatus in accordance with the invention has significantly greater flexibility.

As, in one embodiment, each individual modular unit can be operated separately or collectively or in any combination, and so there is provided the opportunity to perform several different processes at the same time or link them together in any order to perform sequential separation processes. This, in turn, provides the possibility to take a highly complex mixture from any source e.g. a plant or biomass extract, a waste stream from natural or synthetic processes, or the like and separate multiple target compounds by reusing the mobile and stationary phases, and to perform the same in manner which allows the processes to be completely contained and recycled within the apparatus which is formed by the combination of modular units.

This internal recycling and reuse of components within the modular apparatus allows the maximising of the recovery of multiple components from the source material and minimises the total environmental impact of the process operation.

This integrated process operating strategy is achieved though the modular apparatus and is embodied within the management and control system for the same. The strategy can be applied to all forms of counter-current chromatography (CCC) [also known as counter-current separation (CCS)] including but not limited to hydrodynamic CCC, hydrostatic CCC and all other forms of liquid/liquid chromatography and separation. There is therefore provided an integrated processing solution which can also incorporate other processing technologies to suit specific purposes for use of the apparatus. This is achieved by the provision of the modular and integrated provision of the apparatus and the ability to control the same via a single, integrated management/control system.

The invention claimed is:

1. Centrifuge apparatus, said apparatus comprising an inlet for supply of one or more liquids to pass through the apparatus, at least one pump, and a plurality of modules, each of said modules including: a flying lead assembly, a body in which said flying lead assembly is located and a housing, said at least one pump provided to allow the one or more liquids to be pumped into and through the said plurality of flying lead assemblies and from which separated components of the said liquid are collected via one or more outlets, said body rotatable with respect to the housing so as to allow separation of the said components, the provision of said modules allow the adaptation of the processing capacity of the apparatus by the selective interconnection of a number of said modules, a support structure wherein said modules are located in, a plurality of motors provided in the support structure, each said motor connected to rotate the body of a respective module, control means provided for independent control of said modules to allow the plurality of motors and plurality of modules to be independently operable to separate components from an input liquid pumped to the same; and said plurality of modules are selectively provided with the same input liquid or different input liquids to respective modules or the control means operate the motors and modules to operate simultaneously and in combination to separate components from the same input liquid.

2. Apparatus according to claim 1 wherein the module includes connectors adapted for connection to liquid supply means and a component collector.

3. Apparatus according to claim 2 wherein the supply means and/or component collector are the same for each of the modules when used in combination to form the apparatus.

4. Apparatus according to claim 2 wherein the liquid supply means are provided in the form of a reservoir of the one or more liquids and which is used to supply each of the modules connected together at an instant of time.

5. Apparatus according to claim 4 wherein said at least one pump is provided to allow the supply of the liquid from the liquid supply means to each of the modules which are connected to form the apparatus.

6. Apparatus according to claim 1 wherein each body rotates with respect to the housing with which the same is located.

7. Apparatus according to claim 1 wherein each of the plurality of module includes a motor to rotate the body.

8. Apparatus according to claim 7 wherein when the plurality of modules are connected together to form the apparatus, the said module motors operated in a synchronised manner/or independently.

9. Apparatus according to claim 1 wherein the support structure includes the control means to allow the selective engagement of the said modules therewith.

10. Apparatus according to claim 1 wherein the support structure acts as a centralised location for each of the modules which are connected to form the apparatus.

11. Apparatus according to claim 1 wherein the control of the modules allows the capacity to process the different liquids to be selected to suit specific requirements at that time.

12. Apparatus according to claim 1 wherein the flying lead assembly is removable from the body as a unit.

13. A method of operation of centrifuge apparatus comprising a selected number of modules as herein described in claim 1 wherein said method includes:

selectively connecting one or a number of said modules to one or more liquid supply means and simultaneously operating motors connected to operate respective modules to extract components from the one or liquids supplied thereto using control means to independently control each of said modules to separate components from an input liquid pumped to the same and said modules are selectively provided with the same input liquid or different input liquids to respective modules, or using said control means to operate the said motors and modules simultaneously and in combination to separate components from the same input liquid.

* * * * *